United States Patent [19]

Tatar

[11] Patent Number: 4,826,252

[45] Date of Patent: May 2, 1989

[54] SNAP-IN CLIP FOR WHEEL TRIM

[75] Inventor: Richard Tatar, Grenada, Miss.

[73] Assignee: Textron Inc., Providence, R.I.

[21] Appl. No.: 190,958

[22] Filed: May 6, 1988

[51] Int. Cl.4 .............................................. B60B 7/00
[52] U.S. Cl. ........................... 301/37 CD; 301/37 PB
[58] Field of Search ................. 301/37 R, 37 P, 37 C, 301/37 CD, 37 TP, 37 PB, 37 SS, 37 T

[56] References Cited

U.S. PATENT DOCUMENTS

| 2,902,318 | 9/1956 | Lyon | 301/37 PB |
| 3,923,295 | 12/1975 | Leitner | 301/37 CD X |
| 3,999,268 | 12/1976 | Jacobs | 301/37 T X |
| 4,218,099 | 8/1980 | Bayman et al. | 301/37 R |
| 4,344,653 | 8/1982 | Sheldon | 301/37 T |
| 4,736,988 | 4/1988 | Chamberlin et al. | 301/37 CD X |

FOREIGN PATENT DOCUMENTS

| 529974 | 9/1956 | Canada | 301/37 PB |
| 2817967 | 10/1979 | Fed. Rep. of Germany | 301/37 TP |
| 3330524 | 3/1985 | Fed. Rep. of Germany | 301/37 R |
| 718346 | 11/1954 | United Kingdom | 301/37 PB |

Primary Examiner—Robert B. Reeves
Assistant Examiner—Russell D. Stormer
Attorney, Agent, or Firm—John C. Evans

[57] ABSTRACT

A snap-in clip for holding a retainer ring and wheel cover assembly in place on a wheel rim, wherein the clip includes a center strip for abutting against a portion of the retainer ring, three clip extensions formed on one edge of the center strip for extending through openings in a radially outer portion of the retainer ring, and a pair of U-shaped loops formed on the other edge of the center strip for snapping into place around an upturned inner peripheral edge portion of the retainer ring. A pair of retention fingers are also formed on the other edge of the center strip for being resiliently urged into an annular groove in the wheel rim to securely retain the wheel cover concentric thereon. A pair of shock tabs are also formed on the one edge of the center strip with swaged projections formed on the side edges thereof for engaging respective notches in the wheel rim to prevent rotation of the wheel cover assembly relative to the wheel rim. In an alternate embodiment, only two clip extensions, one retention finger, and one shock tab are employed.

14 Claims, 2 Drawing Sheets

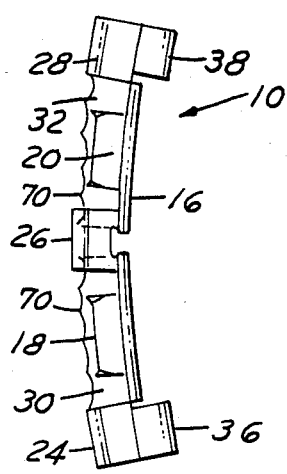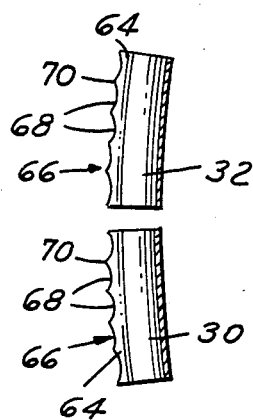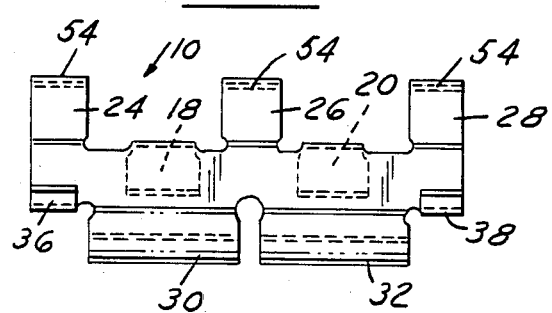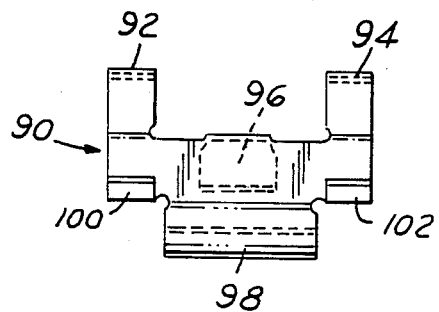

SNAP-IN CLIP FOR WHEEL TRIM

TECHNICAL FIELD

This invention relates generally to fasteners and, more particularly, to snap-in clips for retaining automotive wheel covers in place on wheels.

BACKGROUND ART

Heretofore, spring clips for automotive wheel covers have generally been formed integrally with the wheel or the cover therefor, or were riveted or welded in place. However, some separate clips have been utilized but usually have required a suitable tool or strenuous squeezing by hand to assist in the installation or removal of the clip intermediate the wheel cover and the wheel. For example, Horn U.S. Pat. No. 2,800,368 discloses a spring clip having notched adjacent legs which are compressed or squeezed together by hand or by a tool to insert into and engage an opening in the wheel body. Lyon U.S. Pat. Nos. 2,926,960; 2,964,358 and 2,981,566 each include retaining clips which engage the extreme outer peripheral edge of the respective wheel rims.

Dully et al U.S. Pat. No. 3,348,885 discloses clips 38 which are convoluted to spring fit between the body and rim of a vehicle wheel, with an extended bead which interlocks with spaced teeth on the outer periphery of a wheel cover. Lettner U.S. Pat. No. 3,923,295 illustrates and describes a spring clip having a hook-like holding lug for insertion through a hole in a plate portion of a wheel rim, and a support lug and clamping yoke for confining a circular heading of a hub cap.

Schwers U.S. Pat. No. 4,461,514 discloses a retention clip having an inner arm with barbs formed thereon for entering a recess in a plastic boss of a wheel cover or wheel trim rim, and an outer cam portion and barbed portion adapted to being placed in tension so as to be forced into an annular humped portion of the wheel to lock the wheel cover in place on the wheel.

Arvidsson U.S. Pat. No. 4,598,952 discloses a plurality of clamps in combination with a ring member for mounting a wheel ring or wheel disc on a vehicle wheel, with the ring in interlocking contact with the wheel ring, and a free curved end portion urged into position in a peripheral recess adjacent the rim edge until a support portion contacts the rim. There are no anti-rotation provisions included.

Narita et al. U.S. Pat. No. 4,679,861 includes a resilient retaining member having a body portion with a tongue for fitting into a ribbed receptacle in the wheel cover, and a substantially W-shaped pair of retaining members, one of which includes a resilient tongue for engaging the wheel disc, and the other of which includes a spring catch for engaging a humped area of the wheel rim.

DISCLOSURE OF THE INVENTION

A general object of the invention is to provide an improved clip means for retaining a wheel cover on a vehicle wheel and, more particularly, to provide a snap-in clip which is readily mountable by hand onto a retainer ring of a wheel cover for assembling the latter onto a wheel rim.

Another object of the invention is to provide an improved snap-in clip including means for snapping the clip into place on a retainer ring, with additional means for engaging a vehicle wheel so as to both retain the wheel cover thereon and prevent same from rotating relative thereto during subsequent rotation of the wheel.

A further object of the invention is to provide a snap-in clip for mounting on a retainer ring of a wheel cover to then serve to retain the wheel cover in place on a vehicle wheel, the snap-in clip including cooperating outer and inner extension means for snapping the clip onto the retainer ring, and cooperating retention finger and shock tab means for respectively securing and preventing rotation of the wheel cover on the wheel rim.

A still further object of the invention is to provide a snap-in clip for holding a wheel cover in place on a wheel rim, wherein the clip includes a center strip with at least two clip extensions formed on the outer edge of the center strip for extending through openings in a radially outer portion of a retainer ring of the wheel cover, a pair of U-shaped loops formed on the inner edge of the center strip for snapping into place around an upturned inner peripheral edge portion of the retainer ring, at least one retention finger formed on the inner edge of the center strip for being resiliently urged into an annular groove in the wheel rim to securely retain the wheel cover concentric thereon, and at least one shock tab formed on the outer edge of the center strip with swaged projections formed on the side edges thereof for engaging respective notches in the wheel rim to prevent rotation of the wheel cover assembly relative to the wheel rim.

These and other objects and advantages will become more apparent when reference is made to the following drawings and accompanying description.

BRIEF DESCRIPTION OF THE DRAWINGS

FIG. 2 is a view taken along the plane of the line 2—2 of FIG. 1, and looking in the direction of the arrows;

FIG. 3 is a view taken along the plane of the line 3—3 of FIG. 1, and looking in the direction of the arrows;

FIG. 4 is a side elevational view of one embodiment of the invention; and

FIG. 5 is a side elevational view of an alternate embodiment of the invention.

BEST MODE FOR CARRYING OUT THE INVENTION

Figure 1:
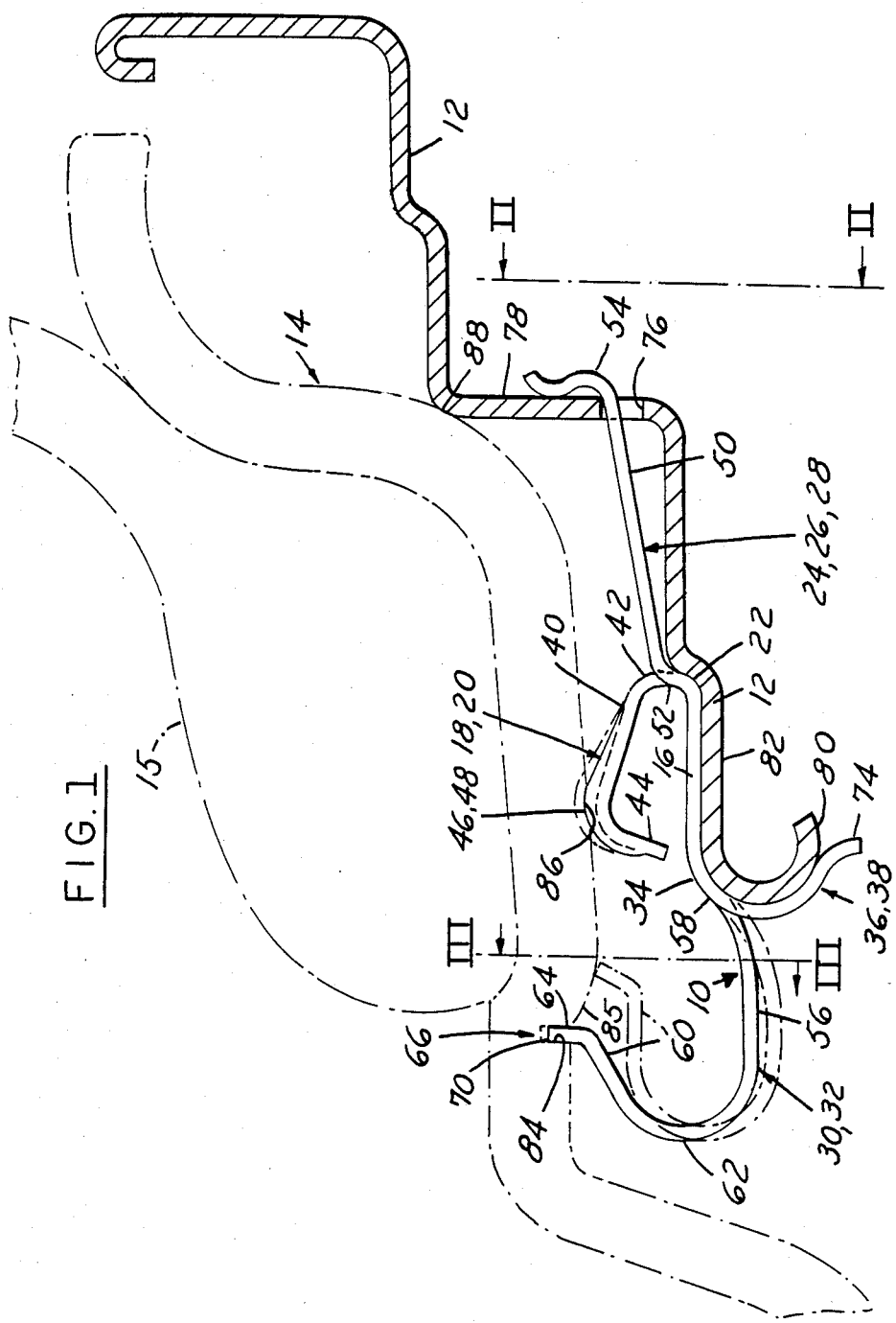
FIG. 1 is an enlarged cross sectional view of a vehicular wheel cover retainer ring and wheel rim embodying the invention.

Referring now to the drawings in greater detail, FIG. 1 illustrates a snap-in clip 10 which is one of a predetermined plurality of snap-in clips which serve to hold an automotive retainer ring 12 in place on a wheel rim 14 adapted to support a pneumatic tire 15.

In general, the snap-in clip 10 includes an arcuate shaped center strip 16 (FIG. 2) formed at a predetermined radius of, say, 6.625 inches, for a purpose to be described. Two spaced shock tabs 18 and 20 are formed to bend inwardly from what is to be the outer edge 22 of the center strip once the latter is positioned in place on the wheel rim. Three equally spaced clip extensions 24, 26, and 28 are formed to extend outwardly from the outer edge 22, with the middle extension 26 being centered between the two shock tabs 18 and 20, and the extensions 24 and 28 located adjacent the ends of the center strip 16 outboard of the respective adjacent outer edges of the shock tabs 18 and 20.

Two spaced retention fingers 30 and 32 are formed to extend from the inner edge 34 of the center strip 16 directly below and in the same general direction as the two shock tabs 18 and 20. Two projections 36 and 38 are formed on the inner edge 34 of the center strip 16 adjacent the ends thereof so as to project in the direction opposite the shock 18 and 20. The two projections 36 and 38 are in alignment with the two outermost clip extensions 24 and 28.

More specifically, each of the shock tabs 18 and 20 has a first segment 40 connected by a bend portion 42 to the outer edge 22 of the center strip 16 so as to extend at a predetermined angle of less than 45° relative to the plane of the center strip. A second segment 44 bends from the distal end of each first segment 40 so as to extend at approximately a right angle therewith toward the center strip 16. A pair of swaged projections 46 and 48 are formed on opposite edges of each shock tab 18 and 20 at the juncture of the first and second segments 40 and 44.

Each of the clip extensions 24, 26 and 28 has a straight portion 50 connected by a double bend portion 52 to the outer edge 22 of the center strip 16 so as to extend at a predetermined shallow angle with the plane of the center strip on the shock tab 18, 20 side thereof. An outer double bend portion 54 is formed on the distal end of each clip extension 24, 26 and 28, extending to the shock tab 18, 20 side of the center strip 16.

Each of the retention fingers 30 and 32 has an arcuate shaped, wide body segment 56 connected by a shallow bend portion 58 to the inner edge 34 of the center strip 1 6 on the projection 36, 38 side thereof. Relative to the radius of the center strip 16, each wide body segment 56 is formed at a predetermined smaller radius of, say, 6.5125 inches, and concentric with the arc of the center strip. A segment 60 is connected by a large bend portion 62 to the distal end of each wide body segment 56 so as to form a "U" therewith. A ledge portion 64 is formed on the free end of each wall segment 60, extending away from the center strip 16. A scalloped edge 66 is formed on the ledge portion 64 by a series of arcuate indentations 68 forming points 70 between adjacent arcuate indentations.

Each projection 36 and 38 is formed as a U-shaped loop portion 72 connected to the inner edge 34 of the center strip 16, with a free edge portion 74 bent to extend outwardly from the center strip.

In operation, the number of snap-in clips 10 required will depend upon the wheel cover diameter, typically, four clips for a 13 inch diameter wheel cover, five clips for a 14 inch wheel cover, and six clips for a 15 inch wheel cover. The clips 10 are easily installed by hand by simply snapping into place and, once installed, they retain the retainer ring 12 and the wheel cover concentric with and secured firmly to the wheel rim 14 without any subsequent relative rotation or movement.

For the manual installation process, each snap-in clip 10 is secured to the retainer ring 12 by inserting the outer double bend portions 54 of the three clip extensions 24, 26 and 28 through openings 76 (FIG. 1) formed in a substantially cylindrical wall portion 78 of the retainer ring 12 of the wheel cover. Inserting the outer double bend portions 54 through the openings 76 causes the U-shaped loops 72 of the projections 36 and 38 to snap into place around an upturned inner peripheral edge portion 80 of the retainer ring 12, bringing the center strip 16 into substantially an abutting relationship with the inner surface of a radially extending wall portion 82 of the retainer ring.

Next, the assembly of the retainer ring 12 and the plurality of snap-in clips 10 assembly onto the wheel rim 14 is accomplished in the following manner:

The scalloped edges 66 of the retention fingers 30 and 32 are caused to engage the wheel rim 14 just radially outward of an annular groove 84 formed in the wheel rim 14 to initially compress the wall segments 60 toward the wide body segments 56. Consequently, the ledge portions 64 are urged radially inwardly along a curved surface 85 of the wheel rim 14 until they enter the annular groove 84, while the inner end of the cylindrical wall portion 78 of the retainer ring 12 seats on an annular bend portion 88 of the wheel rim 14. This action retains the retainer ring and wheel cover securely in place concentrically with the wheel rim.

Simultaneously, the swaged edge projections 46 and 48 of each shock tab 18 and 20 are fitted into notches 86 formed in the wheel rim 14, slightly compressing the elements 40 of the shock tabs toward the center strip 16, with the latter flattened out against the wall portion 82 of the retainer ring 12. It is the seating of the swaged projections 46 and 48 in the notches 86 of the wheel rim 14 which prevents any rotation of the retainer ring 12 relative to the wheel rim 14, as well as serving to increase the integrity of the torque and drop test parameters. The flattened center strip 16 against the wall portion 82 of the retainer ring 12, in conjunction with the compressed shock tabs 18 and 20, serves to eliminate any tendency for looseness among the retainer ring 12, the snap-in clips 1? and the wheel rim 14.

As illustrated in FIG. 5, an alternate snap-in clip 90 is a version of the snap-in clip 10 with fewer parts but similar thereto in structure and function. Specifically, there are two clip extensions 92 and 94, rather than the three clip extensions 24, 26 and 28 of the snap-in clip 10, one shock tab 96, rather than the two shock tabs 18 and 20, and one retention finger 98 rather than the two retention fingers 30 and 32. Two projections 100 and 102 are identical to the two projections 36 and 38 of the snap-in clip 10, and formed directly below the respective two clip extensions 92 and 94.

INDUSTRIAL APPLICABILITY

It should be apparent that the invention provides a novel snap-in clip which is readily installed on the retainer ring of a wheel cover by hand, and which serves to retain an automotive wheel cover concentrically in place on a wheel rim without the possibility of subsequent relative rotation therebetween.

While but two embodiments of the invention have been shown and described, other modification thereof are possible within the scope of the following claims.

The embodiments of the invention in which an exclusive property or privilege is claimed are defined as follows:

1. For use in assembling an automotive retainer ring and wheel cover to a wheel rim, wherein said retainer ring includes an upturned inner peripheral edge portion and an outer cylindrical wall portion with spaced openings therein, and said wheel rim has an annular groove formed in an outer surface therein and a plurality of notches formed therein radially outward of said annular groove, a snap-in clip comprising a center strip abutting against an inner surface of said retainer ring, a pair of clip extensions formed on one edge of said center strip for extending through respective ones of said spaced openings, and a pair of U-shaped loops formed on the other edge of said center strip for snapping into place around said upturned inner peripheral edge portion, at least one retention finger formed on said other edge of said center strip for being resiliently urged into said annular groove in said wheel rim to thereby retain said retainer ring on said wheel rim, and at least one shock tab formed on said one end of said center strip with swaged projections formed on the side edges thereof for engaging said respective notches to thereby prevent rotation of said retainer ring and wheel cover relative to said wheel rim.

2. For use in assembling an automotive retainer ring and wheel cover assembly to a wheel rim, a plurality of snap-in clips, each comprising a center strip for abutting against a portion of said retainer ring, at least one shock tab formed on said center strip so as to extend toward said wheel rim for cooperative engagement therewith, at least one retention finger formed on said center strip so as to extend toward said wheel rim for cooperative engagement therewith, at least two clip extensions formed on said center strip so as to extend toward a radially outer portion of said retainer ring for operative connection therewith, and a pair of projections formed on said center strip for snapping in place around a central portion of said retainer ring.

3. The snap-in clip described in claim 2, wherein said center strip in its free state is arcuately shaped along its length to a predetermined radius.

4. The snap-in clip described in claim 2, wherein said at least one shock tab is connected to the radially outer edge of said center strip by a bend portion, with a first segment extending radially inward from said bend portion at a predetermined angle of less than 45° with said center strip, a second in-turned segment formed at the distal end of said first segment, and a swaged projection formed on each edge of the juncture between said first and second segments for engaging notches formed in said wheel rim.

5. The snap-in clip described in claim 2, wherein said at least one retention finger is connected to the radially inner edge of said center strip by a shallow bend portion with an arcuate-shaped wide body segment extending radially inwardly from said shallow bend portion and formed at a radius slightly less than that of said center strip and concentric therewith, a large bend portion formed at the distal end of said wide body segment, a wall segment formed to extend from said large bend portion on the wheel rim side thereof, and a ledge portion formed on the distal end of said wall segment for engaging an annular groove formed in said wheel rim under the force generated by compressing said wall segment toward said wide body segment during assembly of the retainer ring and wheel cover assembly onto said wheel rim.

6. The snap-in clip described in claim 5, and a scalloped edge formed on said ledge portion.

7. The snap-in clip described in claim 2, wherein said at least two clip extensions are each connected by a double bend portion to the outer edge of said center strip with said at least one retention finger being located therebetween, with a straight portion extending radially outwardly from said double bend portion, leaning slightly toward said wheel rim, and an outer double bend portion formed on the distal end of said straight portion adapted to extend through an opening formed in said retainer ring.

8. The snap-in strip described in claim 2, said projections are connected to the radially inner edge of said center strip on opposite sides of said at least one retention finger, and each consists of a U-shaped loop portion with an outwardly bent free edge portion.

9. The snap-in clip described in claim 2, wherein three clip extensions are equally spaced along the length of said center strip.

10. The snap-in clip described in claim 9, wherein two shock tabs are equally spaced intermediate respective adjacent clip extensions.

11. The snap-in clip described in claim 10, wherein two retention fingers are located adjacent one another below said two shock tabs.

12. The snap-in clip described in claim 11, wherein said pair of projections are formed adjacent the ends of said center strip in alignment with the two outermost clip extensions on opposite outer sides of said two retention fingers.

13. The snap-in clip described in claim 2, wherein two clip extensions are formed adjacent the ends of said center strip.

14. The snap-in clip described in claim 13, wherein one shock tab is located at the center between said two clip extensions.

* * * * *